Patented Mar. 7, 1933

1,900,829

UNITED STATES PATENT OFFICE

OSCAR W. LUSBY, OF BALTIMORE, MARYLAND

CATALYSTS FOR THE PRODUCTION OF OXYGENATED ORGANIC COMPOUNDS

No Drawing.   Application filed June 4, 1927. Serial No. 196,637.

The present invention relates to the catalytic production of synthetic methanol or other oxygenated organic compounds under pressure and particularly to the composition and preparation of improved catalysts for use in such a process.

Methanol can be obtained by the reduction of carbon monoxide or, less favorably, of carbon dioxide with hydrogen at elevated temepratures and pressures through the use of appropriate catalysts according to the reactions:—

$$CO + 2H_2 = CH_3OH$$
$$CO_2 + 3H_2 = CH_3OH + H_2O$$

In addition to these reactions, side reactions may occur, including the deposition of carbon and the formation of methane. Other side reactions may occur giving aldehydes, organic acids, ketones, and various hydrocarbons other than methane.

The main reaction occurs, in the presence of the proper catalyst, at temperatures between 300° and 500° C., and pressures above 50 atmospheres, using a mixture of carbon monoxide or dioxide with hydrogen, the latter preferably in the theoretical proportion or higher.

It is, however, advantageous in practice to use so-called blue water gas, composed chiefly of approximately equal quantities of hydrogen and carbon monoxide, with the hydrogen usually in slight excess, together with small amounts of carbon dioxide, nitrogen, and oxygen. The proportion of hydrogen to carbon monoxide is preferably increased by the addition of hydrogen from an outside source. The commercial water gas generally also contains as impurities hydrogen sulphide and various organic sulphur compounds, consisting largely of carbon disulphide with smaller amounts of such compounds as thiophene, carbon oxysulphide, and mercaptans. The hydrogen sulfide may be readily removed by known processes, while certain difficulties are involved in the complete removal of organic sulfur, which, in commercial blue water gas made from coke or coal is generally present only in small amounts. Traces of organic sulfur in the reacting gases are sufficient, however, to render most of the catalysts mentioned in the literature completely inactive in a relatively short time.

It has been the aim, in part, of the research leading to my invention to secure catalysts of high activity in the synthesis of methanol, which are resistant to the action of sulfur and which may consequently be used with commercial blue water gas, subjected only to the ordinary routine purification for removal of hydrogen sulfide, as is usually practiced in gas works.

A further object of the invention is to produce a catalyst, which may be termed the primary catalyst, giving a minimum of side reactions in the catalyst chamber, but permitting the production, if desired, of higher alcohols or other oxygenated organic compounds through the use of an auxiliary catalyst of known composition, such as a strong alkali placed after the primary catalyst and maintained at an appropriate temperature.

The most efficient primary catalysts discovered in an extensive study have been of the class of combinations of oxides of the metals of different groups of the periodic system, especially those not easily reducible to metal under the operating conditions. In a systematic investigation of a great variety of combinations of oxides of the metals between the second and seventh groups, inclusive, of the periodic system, I have found, in particular, contrary to U. S. Patent No. 1,558,559 to Mittasch and Winkler, no advantage in the use of a predominating quantity of the more basic oxide, but, on the other hand, have found the use of predominating quantities of the less basic oxide to give superior results, both as to activity with pure and commercial gases and in regard to life with gases containing organic sulfur. I have also found the properties of certain of such binary combinations may be improved by the addition of a third metallic oxide. With variation in the temperature, pressure and proportions of gas, the character of the product may be varied to modify the character of the oxygenated organic products. For a satisfactory yield of methanol of high concentration, rather than of other oxygenated products, conditions have been chosen as stated in the examples hereinafter cited.

I have found the use of a mixture of zinc and chromium oxides, with or without a promoter, in proportions corresponding to 50–80 per cent of chromium, to give active catalysts, resistant to the effect of high temperatures and to the poisoning effect of impurities of commercial blue gas. The use of manganese as a promoter has proved effective. Other satisfactory catalysts include mixtures of approximately 10 per cent of zinc oxide and 90 per cent thorium chromate, and of 10 per cent of zinc oxide and 90 percent manganese chromate.

The catalysts may be placed on various carriers, such as pumice. I have found it advantageous in many cases, of which examples are given, to make the catalysts without carriers, either by fusion together of the ingredients or by subjecting the mixture of oxides to high pressure in a mold.

The following are typical examples of catalysts which I have found effective:—

*Example 1*

200 parts of zinc oxide (ZnO), containing 15% manganese oxide (MnO) are precipitated from a mixture of aqueous solutions of the corresponding nitrates by means of potassium hydroxide, washed, filtered, dried, and added slowly with stirring in small amounts to 400 parts of melted chromic anhydride ($CrO_3$) at a temperature of 200–250° C. The mass after cooling is broken into granules and reduced at about 400° C. in a slow stream of hydrogen.

*Example 2*

120 parts of zinc oxide (ZnO), containing 15% of manganese oxide (MnO), are added slowly with stirring to 300 parts of melted chromic anhydride, with subsequent preparation for use, all in the same manner as in Example 1.

*Example 3*

125 parts of zinc oxide (ZnO) precipitated from a solution of zinc nitrate are added to 400 parts of melted chromic anhydride, with subsequent preparation for use, all as in the preceding examples.

*Example 4*

Oxides of chromium, zinc, and manganese corresponding by weight to 37% zinc, 5% manganese, and 58% chromium reckoned as the metals on the percentages by weight of the total calculated metals present, are produced from a mixture of aqueous solutions of ammonium chromate, zinc nitrate, and manganese nitrate, which is evaporated to a pasty mass, when a vigorous reaction occurs between the ingredients of the mixture leaving a light, easily powdered mixture. After moistening, the mass is subjected to high pressures, e. g. 15,000 lbs. per sq. inch, which gives a hard catalyst that is broken into granules and subjected at a temperature of about 400° C. to the action of a slow stream of hydrogen.

Commercial blue water gas, supplemented by a small excess of hydrogen and containing 6 grains of organic sulfur per 100 cu. feet as an impurity, was passed over about 130 c. c. of the above catalyst continuously for a period of about two weeks at a space velocity of 10,000 per hour and at an average temperature of 390–400° C. and an average pressure of 235 atmospheres. During this period the condensate recovered per hour was 50.8 cubic centimeters containing 86.8% methanol, the activity of the catalyst remaining undiminished at the end of this period.

Now having particularly described my invention, what I claim as new and desire to secure by Letters Patent of the United States is:—

1. A heat resistant catalyst for the production of oxygenated organic compounds, consisting of an intimate mixture of zinc oxide and an oxide of chromium, the oxide of chromium being in the greater amount.

2. A catalyst for the production of oxygenated organic compounds consisting of an intimate mixture of zinc oxide and an oxide of chromium, the oxide of chromium being in the greater amount, and containing a promoter consisting of an oxide of a metal lying in the fifth to seventh group, inclusive, of the periodic system.

3. A catalyst for the production of oxygenated organic compounds consisting of an intimate mixture of zinc oxide and an oxide of chromium, the oxide of chromium being in the greater amount, and containing manganese oxide as a promoter in an amount not exceeding 20% of the total weight of the catalyst.

4. A catalyst for the production of oxygenated organic compounds, consisting of an intimate mixture of oxides corresponding by weight to approximately 37% zinc, 58% chromium, and 5% manganese, produced in the evaporation of a mixture of aqueous solutions of ammonium chromate, zinc nitrate, and manganese nitrate, the resultant mass being subjected to pressure to give a hard catalyst, which is broken into granules and treated in a stream of reducing gas.

5. A process for the treatment of gaseous mixtures of hydrogen and carbon monoxide containing organic sulfur as an impurity, comprising passing the said gaseous mixture over a catalyst consisting of oxides corresponding to 58% chromium, 37% zinc, and 5% manganese, at a temperature of 300–450° C. and at a pressure in excess of 50 atmospheres, cooling the gases after reaction, and recovering the resultant methanol.

6. A catalyst for the production of oxygenated organic compounds consisting substantially exclusively of an intimate combination of zinc oxide with at least one metallic oxide, not readily reducible to the metal under operating conditions, the metal of which lies in the fifth to seventh group, inclusive, of the periodic system, with the latter in the greater amount.

7. A catalyst for the production of oxygenated organic compounds consisting substantially exclusively of an intimate combination of zinc oxide with at least one metallic oxide, the metal of which lies in the fifth to seventh group of the periodic system, with the latter oxide in the greater amount, in which at least one of the component oxides is formed by precipitation from a salt of the corresponding metal.

8. A catalyst for the production of oxygenated organic compounds consisting of an intimate mixture of zinc oxide with at least one metallic oxide, the metal of which lies in the fifth to seventh group, inclusive, of the periodic table, with the less basic precipitate in the greater amount, in the preparation of which one of the component oxides is fused for the purpose of securing an intimate mixture with the other component.

9. The process of preparing a catalyst for the production of oxygenated organic compounds comprising precipitation of oxygen containing compounds from a mixture of solutions of salts of zinc and of metals belonging to the fifth to seventh group, inclusive, of the periodic system, with the less basic precipitate in the greater amount, filtering, and drying the resultant mass.

10. The process of preparing a catalyst of the class described comprising the evaporation and heating of solutions of a zinc compound and of a compound of at least one metal belonging to the 5th to 7th group inclusive, of the periodic table, with the less basic in the greater amount, subjecting the resultant mass to pressure to produce a relatively hard mass, breaking said mass into granules of suitable size, and subjecting the said material at a suitable temperature to the action of a reducing gas.

11. The process of preparing a catalyst for the production of oxygenated organic compounds which comprises the addition of a solution of zinc nitrate to a solution of ammonium chromate, using an amount of ammonium chromate at least equal to that of the zinc nitrate, and calcining said precipitate, compressing the resultant mass, breaking said mass into granules, and subjecting the said material to the action of a reducing gas at an elevated temperature.

12. The process of producing oxygenated organic compounds which comprises circulation of a mixture containing hydrogen and carbon monoxide over a catalyst consisting originally of a mixture of zinc oxide and of an oxide of at least one metal belonging to the 5th to 7th group, inclusive, of the periodic system, with the less basic in the greater amount, at a temperature of 300 to 500° C. and at a pressure in excess of 50 atmospheres, cooling the gases after reaction, and recovering the resultant organic product.

13. A process of producing synthetic oxygenated organic compounds which comprises circulating a mixture containing hydrogen and carbon monoxide over a catalyst consisting of an intimate mixture of zinc oxide with at least one metallic oxide, not readily reducible to the metal under operating conditions, the metal of which lies in the 5th to 7th group, inclusive, of the periodic system, with the latter in the greater amount, at a temperature of 300 to 500° C., and at a pressure in excess of 50 atmospheres, cooling the gases after reaction and recovering the resultant organic product.

14. A process for the treatment of gaseous mixtures of hydrogen and carbon monoxide containing organic sulfur, comprising passing the gaseous mixture over a sulfur resistant catalyst of the type set forth in claim 6, at a temperature of 300 to 500° C., and at a pressure in excess of 50 atmospheres, cooling the gases after reaction, and recovering the resultant oxygenated organic product.

15. The process of treatment of gaseous mixtures of hydrogen and carbon monoxide comprising passing the gaseous mixtures in series over a primary catalyst of the type described in claim 6, and an auxiliary catalyst comprising a strong alkali, whereby a part at least of the gaseous mixture is converted into oxygenated organic compounds.

16. In a process of synthesizing oxygenated organic compounds by passing a gas mixture containing hydrogen and an oxide of carbon over a catalyst at elevated temperature and pressure, the invention comprising using a catalyst containing difficulty reducible basic and acidic oxides, the acidic oxide preponderating.

17. The process of synthesizing oxygenated organic compounds which comprises passing a gas mixture containing hydrogen and an oxide of carbon over a catalyst at elevated temperature and pressure, said catalyst containing difficulty reducible basic and acidic oxides with the acidic oxide preponderating in excess of that necessary to form a neutral compound with the basic oxide.

18. The process of synthesizing oxygenated organic compounds which comprises passing a mixture of hydrogen with carbon monoxide at elevated temperature and pressure over a zinc oxide-chromium oxide catalyst in which there is a preponderance of chromium oxide.

19. The process of claim 18 in which the ratio of zinc oxide to chromium oxide is less than 2.

20. In a catalytic process for producing oxygenated organic compounds utilizing a three material equilibrium involving a carbon-oxygen bearing compound in which at least one atom of the oxygen is attached only to the carbon, said compound being capable of adding hydrogen, a carbon-oxygen containing compound capable of losing hydrogen, and hydrogen, the invention which comprises the use of a catalyst containing difficultly reducible basic and acidic oxides, the acidic oxide preponderating.

21. In a catalytic process for producing oxygenated organic compounds utilizing a three material equilibrium involving a carbon-oxygen bearing compound in which at least one atom of oxygen is attached only to the carbon, said compound being capable of adding hydrogen, a carbon-oxygen containing compound capable of losing hydrogen, and hydrogen, the invention which comprises the use of a catalyst consisting of an intimate mixture of zinc oxide with at least one metallic oxide, not readily reducible to the metal under operating conditions, the metal of which lies in the fifth to seventh group, inclusive, of the periodic system, with the latter in the greater amount, the total of the basic oxide material being less than the total of the oxide material which lies in the fifth to seventh group, inclusive, of the periodic system.

In testimony whereof I hereunto affix my signature.

OSCAR W. LUSBY.